Oct. 14, 1969  C. P. RONDEN  3,471,899

EXTRUSION DIE

Filed March 16, 1967  4 Sheets-Sheet 1

INVENTOR.
CLIFFORD P. RONDEN
BY
Arnold, Roylance, Kruger & Durkee
ATTORNEYS

INVENTOR.
CLIFFORD P. RONDEN
BY
Arnold, Roylance, Kruger & Durkee
ATTORNEYS

INVENTOR.
CLIFFORD P. RONDEN

United States Patent Office 3,471,899
Patented Oct. 14, 1969

3,471,899
EXTRUSION DIE
Clifford P. Ronden, Edmonton, Alberta, Canada, assignor to Cupples Container Company, Austin, Tex., a corporation of Missouri
Filed Mar. 16, 1967, Ser. No. 623,619
Int. Cl. B29d 23/04; B29f 3/04
U.S. Cl. 18—14                                    8 Claims

ABSTRACT OF THE DISCLOSURE

A variable orifice extrusion die for extruding tubular products from thermoplastic materials having a conical torpedo disposed concentrically within a hollow die body. The torpedo and cooperating die body define a streamlined, elongated annular flow passage for the heat-plastified material. The die orifice is defined by a mandrel secured to the front end portion of the torpedo and a surrounding die ring. The mandrel, surrounding die ring and front end portions of the torpedo and die body are interchangeable with other like elements in order to change the diameter of the die orifice. The configuration and arrangement of the flow passage defining elements are such that the length of travel of the plastic material remains substantially the same regardless of the orifice diameter being employed. The configuration of the portion of the flow passage defined by the non-interchangeable portion of the torpedo and surrounding hollow body is such that the cross-sectional area of this portion of the passage remains constant throughout its length.

---

This invention relates to extrusion dies for polymeric thermoplastic materials and, more particularly, to such dies which extrude the material through an annular die orifice in the production of sheet.

It has become common practice to produce thermoplastic polymeric sheet by extruding the heat-plastified polymeric material through an annular orifice to form an initially tubular product, inflating the tubular product to establish biaxial orientation, and then slitting the tubular product longitudinally and converting the product to a running web. To carry out this process, it is necessary to equip the extruder with a die having an annular extrusion orifice, and many dies of this type have heretofore been proposed. Despite the fact that this art is already well advanced, at least for the extrusion of polyethylene, polypropylene, and the like into film, a number of problems arise in connection with the extrusion die which have heretofore remained unsolved. In particular, the prior-art extrusion dies of this type have made no satisfactory provision for changing from one diameter of extrusion orifice to another. In many cases, there has been no way at all to change the orifice diameter. In other cases, it has been possible to change the orifice diameter by adding or removing parts, but these prior-art dies have had the disadvantage that the length of travel of the plastic material through the die has varied markedly, depending upon the orifice diameter being employed. Additionally, the prior-art extrusion dies have been unduly complicated and expensive.

Additional difficulties are encountered when such dies are to be employed for the extrusion of foamable thermoplastic materials such as foamable polystyrene. In extrusion of such materials, the die is operated in a relatively low temperature range and the problem of attaining proper flow of the heat-plastified material within the die becomes particularly severe.

It is accordingly a general object of the invention to provide a die of the type described in which the foregoing objects are solved more satisfactorily than has heretofore been possible.

Another object is to devise an extrusion die having an annular extrusion orifice and which is so constructed that the diameter of the orifice can be changed with relative ease.

Yet another object is to provide such a die wherein the effective length of travel of the plastic material through the die remains substantially unchanged regardless of the diameter of the extrusion orifice.

A further object is to provide such a die which is simpler and less expensive than those heretofore proposed.

A still further object is to devise an extrusion die of the type described which includes a streamline tubular flow passage for the heat-plastified material, the flow passage having a minimum of obstructions to flow of the plastic material and the structure being such that all of the plastic material within the flow passage is maintained uniformly at the desired temperature.

Stated broadly, the invention provides a die structure wherein the heat-plastified polymeric material is conducted to the annular die orifice via an elongated, streamline annular flow passage defined by internal torpedo means and cooperating hollow body means, and the die orifice is defined by a mandrel and a surrounding die ring, the front end portions of the torpedo means and hollow body means, the mandrel, and the surrounding die ring being interchangeable with other like elements in order to change the diameter of the die orifice. The configuration of that portion of the flow passage which is defined by the non-interchangeable portion of the internal torpedo means and the surrounding hollow body means is such that the cross-sectional area of said portion of the passage remains constant throughout its length, despite the increasing diameter of the torpedo means. The configuration and arrangement of all flow passage defining parts of the structure are such as to assure that the passage will smoothly and uniformly conduct the heat-plastified material forwardly to the orifice, none of the plastic material being allowed to "dwell" and thus become over-heated, and proper flow being achieved even when the die temperature is maintained at values in the softening range of the plastic which are well below that point at which viscous flow commences.

In order that the manner in which the foregoing and other objects are achieved in accordance with the invention can be understood in detail, a particularly advantageous embodiment thereof will be described with reference to the accompanying drawings, which form a part of this specification, and wherein.

Figure 1:
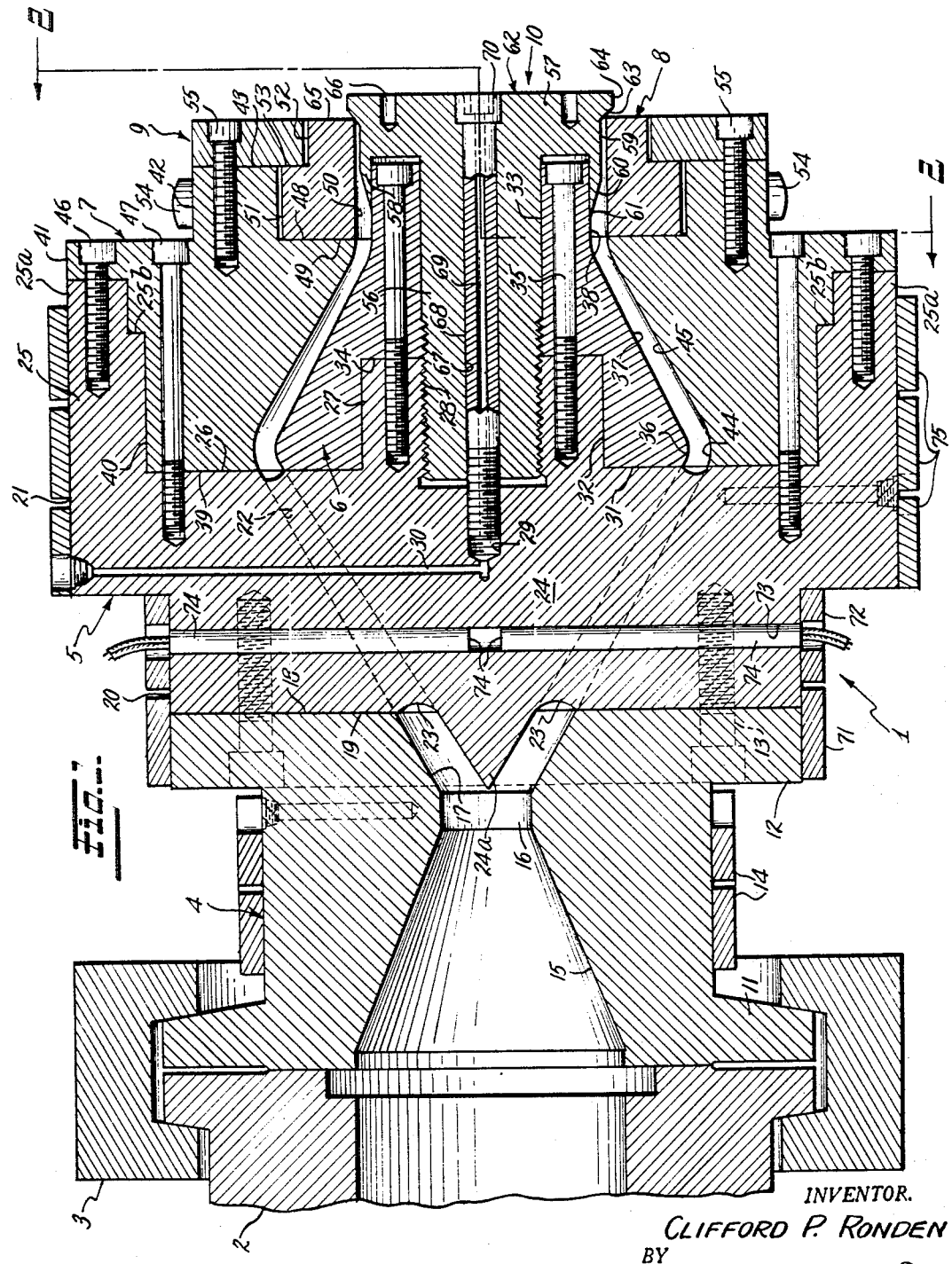
FIG. 1 is a longitudinal sectional view of the die assembled for smaller diameter extrusion.
Figure 2:
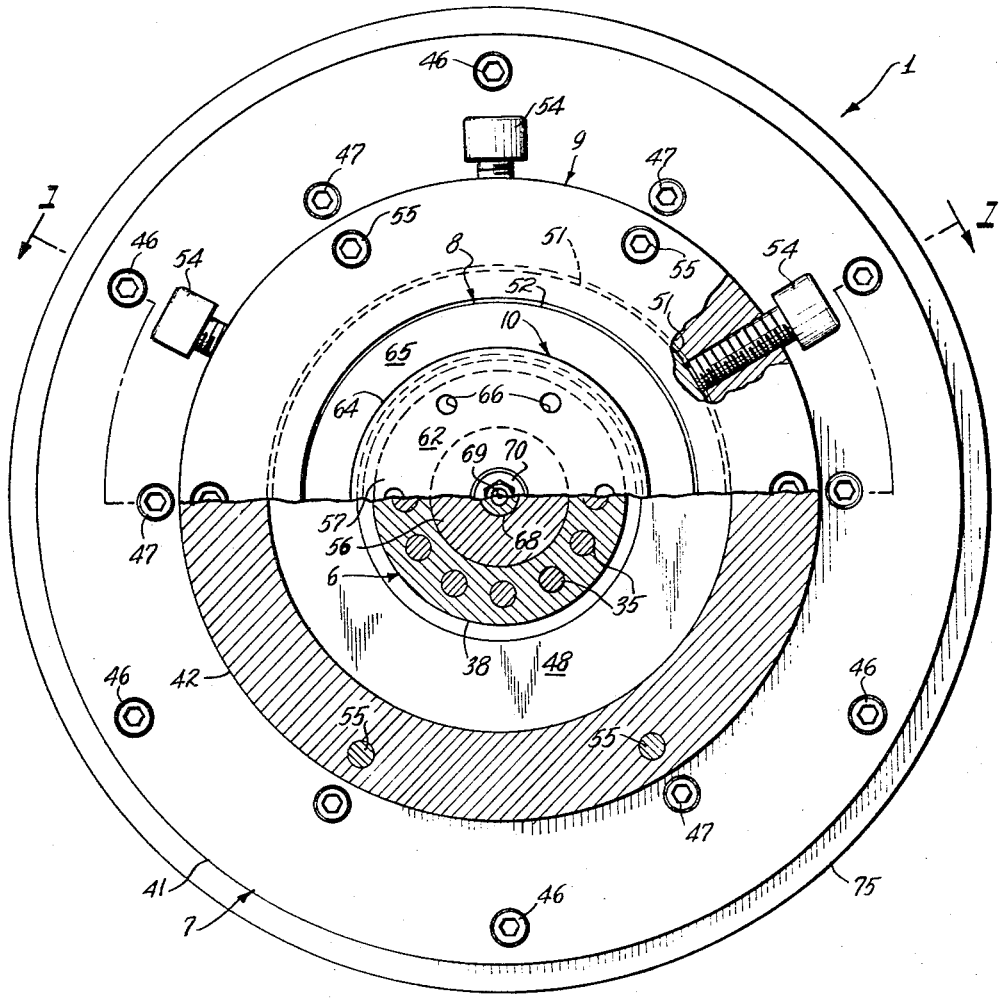
FIG. 2 is a view, partly in front end elevation and partly in transverse cross section, taken generally on line 2—2, FIG. 1.

Referring now to the drawings in detail, and first to FIGS. 1 and 2, the embodiment of the invention here illustrated comprises a die structure indicated generally at 1 and secured to the body 2 of a conventional extruder by means of a ring clamp 3. The die structure includes a rear die body member 4, a main torpedo body 5, an interchangeable torpedo body 6, an internal fixed die ring 7, a floating die ring 8, an external fixed die ring 9 and a mandrel 10.

Rear die body member 4 is cylindrical and includes a circular rear flange 11, secured against the front flange of the extruder body by the clamp 3, and a circular front flange 12 secured to the flat rear face of main torpedo body 5 by screws 13. Between flanges 11 and 12, body member 4 has a right cylindrical outer surface on which conventional cylindrical electrical resistance heater bands 14 are disposed. The bore of body member 4 includes a frustoconical rear portion 15 which tapers forwardly and inwardly to join a short cylindrical portion 16, the bore being completed by a relatively short frustoconical front portion 17 which tapers from portion 16 forwardly and outwardly to open through the front face 18 of the body member.

Main torpedo body 5 has a flat rear face 19, lying in flush engagement with face 18, a rear cylindrical outer surface portion 20 of the same diameter as flange 12, and a front outer surface portion 21 of substantially larger diameter. Internally, body 5 has a frustoconical wall 22 which tapers forwardly and outwardly as a continuation of the wall of the frustoconical bore portion 17 of member 4 and is interrupted by a single pair of diametrically aligned webs or spider arms 23 which support the rearwardly tapering conical torpedo portion 24. At its rear end, body 5 has an outer, forwardly projecting tubular portion 25, a flat transverse annular face 26, and a cylindrical forwardly projecting central boss 27 which is concentric with portion 25 and is provided with a forwardly opening threaded central bore 28. Bore 28 stops just behind face 26, and a smaller diameter threaded bore 29 extends axially therefrom to intersect a radial duct 30 provided at its outer end with a threaded socket to accommodate a connector (not shown) for the usual compressed air line. Portion 25 is cylindrical and includes a front end portion 25a of enlarged internal diameter, compared to the remainder of portion 25, there being a forwardly facing transverse annular shoulder at 25b.

Wall 22 and the conical outer surface of torpedo portion 24 cooperate to form a generally frustoconical flow passage which communicates directly with the front bore portion 17 of body member 4 and opens forwardly through face 26. The tip 24a of torpedo portion 24 projects rearwardly from body 5 through bore portion 17 of member 4 so that the conical surface of portion 24 also cooperates with the wall of bore portion 17 to define a continuation of the frustoconical passage just mentioned. The tubular flow passage defined by the outer surface of torpedo portion 24 and the surrounding wall of bore portion 17 and wall 22 increases in diameter forwardly. The wall of bore portion 17 and the wall 22 can be considered as a single continuous frustoconical surface and it will be noted that this surface converges forwardly toward the outer surface of torpedo portion 24. The arrangement is such that the transverse cross-sectional area of the flow passage at surface 26 is equal to the transverse cross-sectional area of cylindrical bore portion 16.

The interchangeable torpedo body 6 has a flat transverse annular rear face 31, a cylindrical rear bore portion 32 of a diameter such as to snugly embrace the central boss 27 of body 5, and a cylindrical front bore portion 33 of a diameter substantially equal to that of bore 28 in boss 27, bore portions 32 and 33 being joined by a transverse annular rearwardly facing shoulder 34. Body 6 is removably secured to body 5, as by screws 35, with rear face 31 and shoulder 34 in respective engagement with face 26 and the front end of boss 27. At the rear end of body 6, the outer surface portion 36 thereof tapers forwardly and outwardly as a continuation of the surface of torpedo portion 21 of body 5, and then curves smoothly to join a forwardly and inwardly tapering frustoconical intermediate surface portion 37. At its front end, surface portion 37 curves smoothly to join a right cylindrical front surface portion 38 which is concentric with the longitudinal axis of body 5.

The internal fixed ring 7 has a flat transverse annular rear face 39, a rear cylindrical outer surface portion 40 of a diameter such as to be snugly embraced by tubular portion 25 of body 5, a transverse annular outwardly projecting flange 41 of the same outer diameter as is portion 25, and a forwardly projecting tubular cylindrical portion 42 which is concentric with and of a smaller diameter than flange 41 and which has a flat transverse annular front face 43. Internally, ring 7 has a central bore defined by wall portions 44 and 45 which are of larger diameter than the outer surface portions 36 and 37, respectively, of body 6. Surface 45 tapers forwardly and inwardly somewhat more sharply than does surface 37, so that the flow passage portion defined by these two surfaces decreases progressively in transverse cross-sectional area at a more rapid rate than would result solely by the decreasing diameter.

Ring 7 is secured to body 5 by screws 46 and 47 with the rear face 39 of the ring engaging the front face 26 of body 5, with outer surface portion 40 embraced snugly by portion 25 of body 5, and with the rear face of flange 41 engaging the front end face of portions 25. The central bore of ring 7 is axially shorter than body 6 so that, when body 6 and ring 7 are both properly secured to body 5, the front face 48 of the ring, inwardly of portion 42, lies in a transverse plane intersecting cylindrical outer surface portion 38 of body 6 immediately adjacent the juncture between that surface portion and surface portion 37.

Floating die ring 8 has a flat transverse rear face 49, a right of cylindrical inner surface 50 of the same diameter as the front end of wall portion 45 of ring 7, and cylindrical outer surface portions 51 and 52, the front surface portion 52 being of smaller diameter than portion 51 and the two surface portions being joined by a flat transverse annular forwardly facing shoulder 53. The axial distance between face 49 and shoulder 53 is substantially equal to the axial distance between faces 48 and 43. The diameter of rear outer surface portion 51 is slightly smaller than the inner diameter of tubular portion 42 of ring 7 so that, when ring 8 is inserted into portion 42 with rear face 49 engaging front face 43, the lateral position of ring 8 relative to ring 7 can be adjusted. Ring 8 is secured rigidly, by radial screws 54, FIG. 2, with the ring in a position such that its inner surface 50 is concentric with front surface portion 38 of body 6 and forms a continuation of the front end of internal surface portion 45 of ring 7. Screws 54 project inwardly through radial threaded bores in tubular portion 42 of ring 7, the tips of the screws directly engaging outer surface portion 51 of ring 8.

The external fixed ring 9 is of rectangular cross section and has an outer diameter equal to that of portion 42 of ring 7 and an inner diameter slightly larger than the diameter of the outer front surface portion 52 of the floating ring 8. With ring 8 in place, ring 9 is secured rigidly to tubular portion 42 of ring 7 by screws 55, the rear face of ring 9 being in flush engagement with front end face 43 of portion 42 and with shoulder 53. Ring 9 thus serves to clamp ring 8 against face 48 of ring 7 and prevents axial movement of ring 8 relative to the die structure.

Mandrel 10 comprises an elongated cylindrical body portion 56 and a transversely enlarged nose portion 57. Body portion 56 is of a diameter to be slidably embraced by the wall of bore portion 33 of the interchangeable torpedo body 6, and is threaded at its rear and for operative engagement with threaded bore 28 of body 5. Nose portion 57 has an outer rearwardly projecting cylindrical skirt 58 of an inner diameter such as to slidably embrace the cylindrical outer surface portion 38 at the front end of body 6. The outer surface of nose portion 57 includes an intermediate right cylindrical portion 59 of larger diameter than surface portion 38, and a rearwardly and inwardly tapering frustoconical portion 60 such that the skirt terminates in substantially a knife edge 61 at surface 38 of body 6. The cylindrical intermediate portion 59 of the outer surface of the mandrel nose terminates short of front face 62, the remainder of the outer surface including an outwardly and forwardly tapering frustoconical portion 63 and a cylindrical portion 64.

The length of the mandrel is such that, when mandrel body 56 is threaded fully into bore 28, the juncture between inner surface 50 and front face 65 of ring 8 is disposed intermediate the ends of frustoconical surface portion 63 of the nose of the mandrel, so that the juncture and surface portion 63 define the die orifice. The radial width of this orifice (the die gap) can be adjusted by rotation of the mandrel so that the screw thread engagement at bore 28 will cause the mandrel to move forwardly or rearwardly relative to ring 8, depending upon the direction of rotation.

For this purpose, the front of nose portion 57 is provided with recesses 66 to accept the lugs of any suitable adjusting tool.

Mandrel 10 has a central axial bore 67 which accommodates an elongated screw 68 having an axial through passage 69. The threaded tip of screw 68 is engaged in threaded bore 29 in member 5, and the enlarged head 70 of the screw is accommodated in a central recess at the front end of the mandrel, the head of the screw directly engaging the mandrel to apply an axial force thereto and thus fix the mandrel against rotation after the die gap has been adjusted. Through passage 69 opens into bore 29 and thus communicates with duct 30 for the supply of compressed air forwardly through the center of the mandrel.

A central heating band 71 embraces the outer surface of front flange 12 of body member 4 and overlaps the end of surface portion 20 of body 5. The remainder of surface portion 20 accomodates a circular heating band 72. A transverse bore 73, FIG. 1, extends completely through body 5 along a line through the diametrically aligned spider arms 23 and accommodates a conventional electrical resistance heating cartridge 74. The heating cartridge 74 is thus effective to heat the conical torpedo portion 24 and also the spider arms 23 so that the temperature of the surfaces contacted by the heat-plastified polymeric material can be maintained approximately uniform, particularly throughout the length of torpedo portion 24.

Three additional heating bands 75 embrace outer surface 21 of body 5. The combination of heating bands 14, 71, 72 and 75, spaced along the die structure, can be considered as a primary heating means supplying the major input of heat to the die structure. The heater or heaters disposed in bore 74 can be considered as a secondary heating means for supplying heat more directly to the torpedo portion and spider arms so that, for example, the tendency for there to be a marked temperature differential between surface 22 and the outer surface of torpedo portion 24 is minimized.

Figure 3:
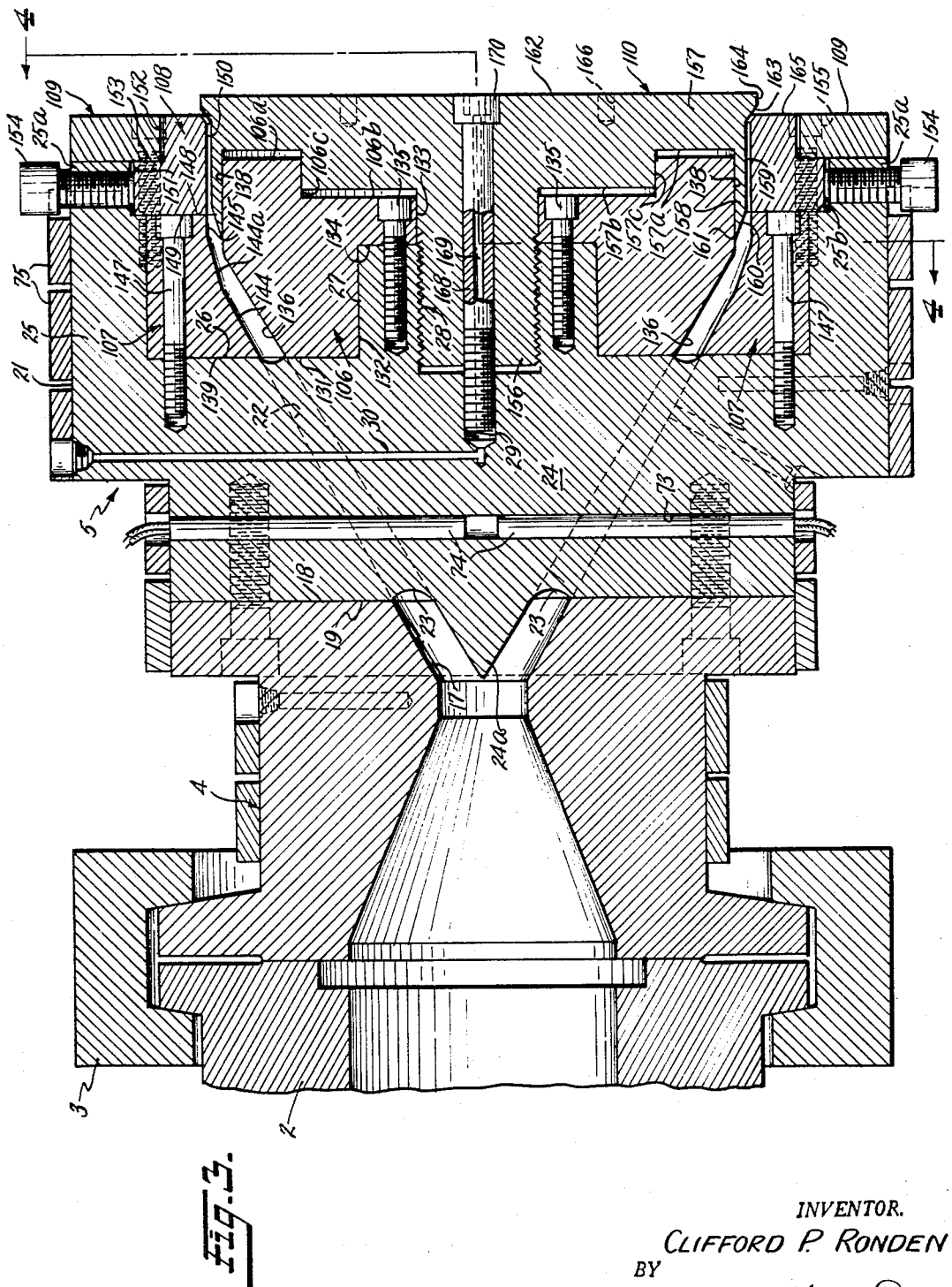
FIG. 3 is a view similar to FIG. 1 but showing the die assembled for larger diameter extrusion.
Figure 4:
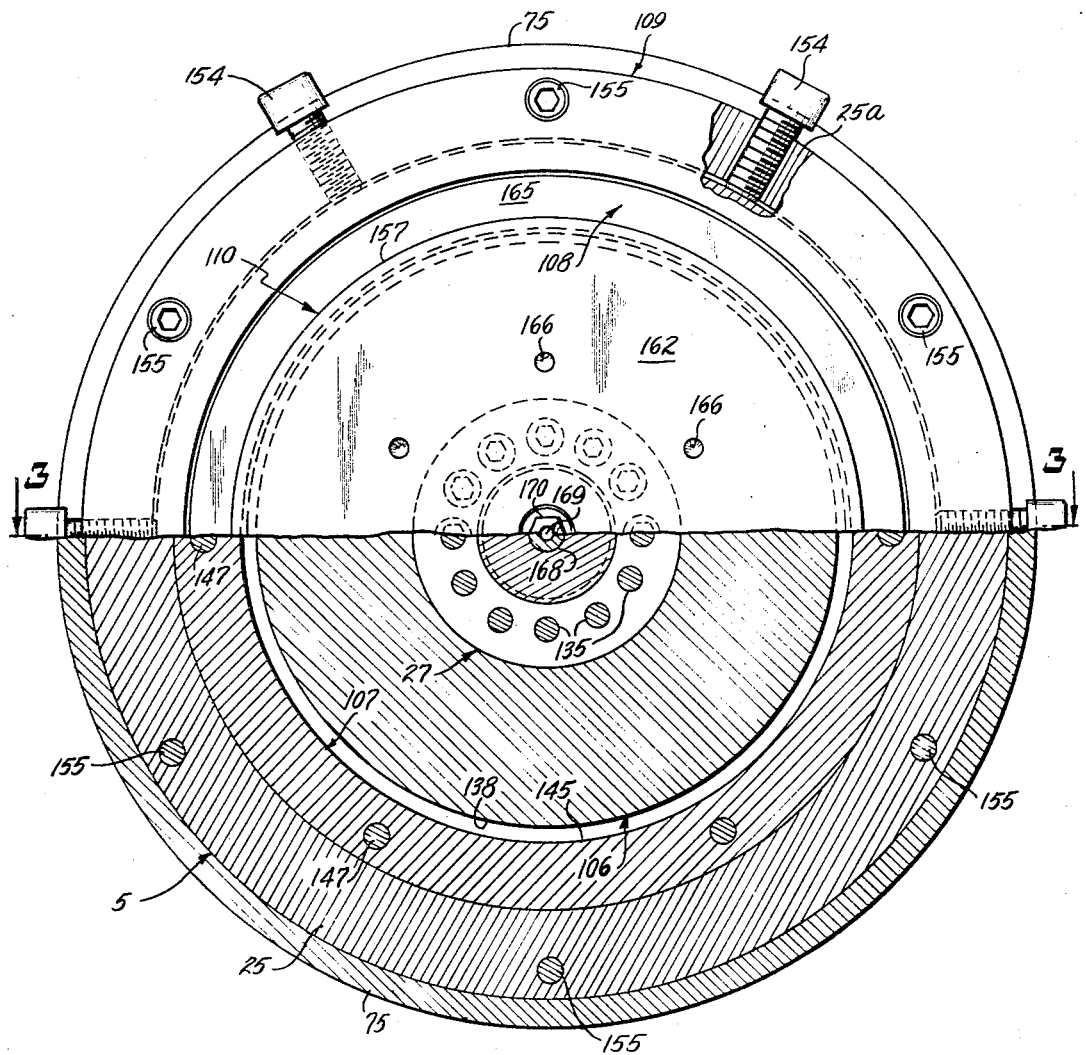
FIG. 4 is a view, partly in front end elevation and partly in transverse cross section, taken on line 4—4, FIG. 3.

Turning now to FIG. 3, it will be noted that the front one of heating bands 75 is notched to provide clearance for a plurality of threaded bores extending radially through the front end portion 25a of tubular projection 25 of body 5 to accommodate radial screws 154.

Comparing FIGS. 1 and 3, it will be seen that rear body member 4 and main torpedo body 5 are the same elements in each figure. However, in order to provide the larger diameter die orifice of FIG. 3, the interchangeable torpedo body 6, internal fixed ring 7, floating die ring 8, external fixed ring 9, and mandrel 10, all used to provide the smaller die orifice of FIG. 1, are respectively replaced by equivalent elements 106–110.

The interchangeable torpedo body 106 has a flat transverse annular rear face 131, a cylindrical centrally disposed rear bore portion 132 of a diameter to snugly embrace boss 27 of body 5, and a cylindrical front bore portion 133 substantially equal in diameter to bore 28 of boss 27, bore portions 132 and 133 being joined by a transverse annular rearwardly facing shoulder 134 engageable with the end face of boss 27. Body 106 is removably secured to body 5 by screws 135, with face 131 and shoulder 134 respectively engaging face 26 and the front end face of boss 27. A frustoconical outer surface portion 136 of body 106 tapers forwardly and outwardly over approximately one-half of the length of the body and is disposed to constitute a forward extension of the outer conical surface of torpedo portion 24 of body 5. Surface portion 136 curves smoothly into a right cylindrical front surface portion 138. The front end face of body 106 includes flat transverse annular outer and inner portions 106a and 106b, respectively, which are joined by an intermediate axially extending right cylindrical portion 106c.

The fixed ring 107 has a flat transverse annular rear face 139 and a right cylindrical outer surface 140, the length of ring 107 being equal to the axial space between surface 26 and shoulder 25b so that, in the assembled die, with faces 26 and 139 in engagement, shoulder 25b and the front end face 148 of ring 107 lie in a common plane. Ring 107 is removably secured to body 5 by screws 147. The central bore of ring 107 is defined by a rear frustoconical surface portion 144, an intermediate frustoconical surface portion 144a, and a right cylindrical front surface portion 145. Surface portion 144 surrounds the rear portion of surface 136. Surface portion 144a surrounds the remainder of surface 136 and the rear portion of surface 138. The relatively short surface portion 145 surrounds a corresponding portion of surface 138. Surface portions 144, 144a and 145 are concentric with the corresponding surface portions of body 106 and spaced outwardly therefrom so as to define an annular passage constituting a continuation of the passage defined by the outer surface of torpedo portion 24 and the inner surface 22 of the main portion of body 5.

Surface portion 144 tapers forwardly and outwardly at the same angle as surface 22 and, in the assembled die, constitutes a continuation of that surface. Surface 144a also tapers forwardly and outwardy, but at a smaller angle than does surface portion 144. Surface 22 and the conical surface of torpedo portion 24 converge forwardly, as do the corresponding surfaces of ring 107 and body 106, so that the radial width of the resulting passage decreases as the diameter thereof increases, and each axial increment of the passage thus accommodates substantially the same amount of the plastic material being conducted through the passage.

Floating ring 108 has a flat transverse annular rear face 149, a right cylindrical inner surface 150 of the same diameter as surface portion 145 of ring 107, and cylindrical outer surface portions 151 and 152, front portion 152 being of smaller diameter and the two portions being joined by a transverse annular forwardly facing flat shoulder 153. The radial distance between surface 150 and surface portion 151 is such that, when ring 108 is in place, its rear surface 149 lies in face-to-face contact with end face 148 and shoulder 25b. Ring 108 is removably secured to body 5 by radial screws 154 and ring 109, and adjustment of screws 154 is effective to assure precise concentricity between surfaces 138 and 150.

Ring 109 is of rectangular transverse cross section, the diameter of the outer cylindrical surface thereof equalling the outer diameter of portion 25 of body 5, and the inner diameter being slightly larger than the diameter of surface portion 152 of ring 108. Ring 109 is removably secured to portion 25 of body 5 by screws 155 in such fashion that the rear face of ring 109 is in flush engagement with both shoulder 153 and the end face of portion 25. Thus, ring 109 serves to clamp ring 108 against axial movement relative to the remainder of the die structure.

Mandrel 110 comprises an elongated body portion 156, threaded for engagement with threaded bore 28 of boss 27, and a transversely enlarged nose portion 157. The diameter of body portion 156 is such that the mandrel is movable axially relative to surrounding surface 133 of body 106. Nose portion 157 has an outer rearwardly projecting cylindrical skirt 158 of an inner diameter such that the skirt slidably embraces surface portion 138 of body 6. The outer surface of nose portion 157 includes an intermediate right cylindrical portion 159 of a diameter larger than that of surface portion 138 but smaller than that of inner surface 150 of ring 108. At its rear end, skirt 158 has a rearwardly and inwardly tapering frustoconical outer surface portion 160 so disposed that the skirt terminates in a substantially knife edge 161, at surface 138 of body 106 in the assembled die. The outer surface of the nose portion of the mandrel is completed by an outwardly and forwardly tapering frustoconical surface portion 163, and a short cylindrical portion 164. In the area between body portion 156 and skirt 158, nose portion 157 has concentric, axially spaced outer and inner flat annular rear faces 157a and 157b, respectively, which are joined by an axially extending cylindrical surface 157c of substantially the same axial length as surface 106a of body 106 and of such diameter as to be slidably embraced by surface 106c. The mandrel has a flat front face 162 provided with sockets 166 to cooperate with a suitable tool by which the mandrel can be turned for axial adjustment when it is desired to change the die gap defined by surface 163 and the juncture between surfaces 150 and 165 of ring 108.

Central axial bore 167 of mandrel 110 accommodates an elongated screw 168 having an axial through passage 169 and an enlarged head 170. The threaded tip of this screw cooperates with the threaded bore 129 in body 5. With the mandrel and screw in place as shown in FIG. 3, passage 169 communicates with bore 29 and thus with duct 30 for the supply of air forwardly through the mandrel to inflate the tubular plastic product extruded by the die.

When used herein, the term "sheet" is intended to include film of a thickness less than 0.010 in. as well as thicker sheet material of a thickness above 0.010 in.

Attention is called to my copending application Ser. No. 623,643, filed concurrently herewith and directed to the combination including torpedo portion 24, spider arms 23 and heater 74.

What is claimed is:

1. In an extrusion die for extruding a tubular product from thermoplastic polymeric material, the combination of:

first body means comprising:
  a hollow outer body having a forwardly and outwardly tapering frustoconical inner wall and a transverse annular front face surrounding the front end of said inner wall,
  a conical torpedo body disposed concentrically within said frustoconical wall of said outer body, the conical surface of said torpedo body being of smaller diameter than and spaced inwardly from said frustoconical wall so that said frustoconical wall and said conical surface define a forwardly and outwardly tapering tubular passage portion, said torpedo body having a transverse front face, and
  a plurality of spider arms extending across said passage portion and interconnecting said outer body and said torpedo body to support said torpedo body on said outer body;
a removable torpedo body portion having:
  a transverse rear face, and
  an outer surface including a cylindrical front portion and a tapered rear portion;
releasable fastener means for securing said removable torpedo body portion to said conical torpedo body with said rear face of said removable torpedo body portion engaging said front face of said conical torpedo body,
  the diameter of the rear end of said outer surface of said removable torpedo body portion and the diameter of the front end of said conical surface of said torpedo body being equal so that, when said removable torpedo body portion is so secured, its outer surface constitutes an effective continuation of said conical surface;
a first removable ring having:
  a transverse rear face, and
  an inner surface of larger diameter than said surface of said removable torpedo body portion;
releasable fastener means for securing said first removable ring to said outer body with said rear face of said ring engaging said front face of said outer body,
  the diameter of the rear end of said inner surface of said ring and the diameter of the front end of said frustoconical wall of said outer body being equal so that, when said ring is so secured, its inner surface constitutes an effective continuation of said frustoconical wall,
  said outer surface of said removable torpedo body portion and said inner surface of said removable ring being concentric and defining a forwardly extending continuation of said tubular passage portion when said torpedo body portion and said ring are secured to said first body means by said releasable fastener means;
a mandrel comprising:
  an elongated shank, and
  a transversely enlarged nose portion,
  said shank being threaded at its rear end and said conical torpedo body having a central forwardly opening threaded bore into which the threaded portion of said shank can be screwed so that said mandrel is supported by said conical torpedo body and is axially adjustable with respect thereto,
  said nose portion including a peripherally disposed rearwardly projecting cylindrical skirt having an inner diameter such as to surround and be slidably engaged with said cylindrical front portion of said outer surface of said removable torpedo body portion;
a second removable ring having a cylindrical inner surface of a diameter equal to that of the front end of said inner surface of said first removable ring and larger than the outer surface of said skirt, and
mounting means operative to secure said second ring in a position such that said inner surface of said second ring and said outer surface of said skirt are precisely concentric,
  the front end of said inner surface of said second ring and said nose portion coacting to define the extrusion orifice of the die.

2. A die according to claim 1 wherein:
said tapered portion of said outer surface of said removable torpedo body tapers forwardly and inwardly,
said inner surface of said first ring tapers forwardly and inwardly, and
said mounting means includes releasable fastener means operative to secure said second ring to the front end portion of said first ring.

3. A die according to claim 1, wherein:
said outer body means includes a forwardly projecting annular portion surrounding said annular front face of said outer body means,
  said first ring being of such diameter as to be insertable into and embraced by said forwardly projecting annular portion.

4. A die according to claim 3, wherein:
said forwardly projecting annular portion has a front end portion of enlarged internal diameter and a forwardly facing transverse annular shoulder at the rear end of said front end portion,
the outer diameter of said second ring is such that said second ring can be inserted into and embraced by said front end portion with the rear face of said second ring engaging said shoulder, and
said mounting means includes a third ring adapted to be secured to the front face of said forwardly projecting annular portion of said outer body means and having a radial dimension such that, when said third ring is so secured, an inner peripheral portion of said third ring will overlap and lie in flush engagement with a front face portion of said second ring.

5. A die according to claim 3, wherein:
said tapered portion of said outer surface of said removable torpedo body, and said inner surface of said first ring, both taper forwardly and inwardly,
said first ring is of such axial dimension as to project forwardly beyond said forwardly projecting annular portion of said outer body means when said rear face of said first ring is engaged with said annular front face of said outer body means, and
said mounting means includes releasable fastener means operative to secure said second ring to the front end portion of said first ring.

6. A die according to claim 5, wherein:
the portion of said first ring which projects beyond said forwardly projecting annular portion of said outer body means has an inner surface of substantially greater diameter than does the front end of the forwardly and inwardly tapering main inner surface of said first ring and is joined to said main inner surface by a transverse annular forwardly facing shoulder.
the outer diameter of said second ring being such that the same can be inserted into the space defined by said forwardly projecting portion of said first ring and into engagement with said shoulder, and
said mounting means includes a third ring and releasable fastener means for securing said third ring to the front face of said forwardly projecting portion of said first ring,
said third ring having a radial dimension such that, when said third ring is so secured, a portion thereof overlaps and lies in flush engagement with a front face portion of said second ring.

7. A die according to claim 1, wherein:
said tapered portion of said outer surface of said removable torpedo body, and said inner surface of said first ring, both taper forwardly and outwardly, and
said mounting means comprises releasable fastener means operative to mount said second ring on said outer body means.

8. A die according to claim 7, wherein:
said outer body means comprises a forwardly projecting annular portion surrounding said annular front face of said outer body means,
the axial length of said forwardly projecting annular portion of said outer body means being greater than the axial length of said first ring,
said first ring being wholly enclosed by said forwardly projecting annular portion of said outer body means when said rear face of said first ring is engaged with said annular front face of said outer body means.

References Cited
UNITED STATES PATENTS

| | | | |
|---|---|---|---|
| 1,541,528 | 6/1928 | Royle | 18—14 |
| 1,876,256 | 9/1932 | Maynard | 18—14 |
| 2,913,763 | 11/1959 | Longstreth et al. | 18—14 |
| 3,079,634 | 3/1963 | Berger | 18—14 |
| 3,146,495 | 9/1964 | Sanford | 18—14 |
| 3,345,690 | 10/1967 | Hagen | 18—14 |
| 3,339,235 | 9/1967 | Nossel | 18—14 |

WILLIAM J. STEPHENSON, Primary Examiner